(No Model.)

L. A. H. GRENELLE.
VEIL HOLDER.

No. 464,864. Patented Dec. 8, 1891.

WITNESSES:
Paul Johel
C. Sedgwick

INVENTOR
L. A. H. Grenelle
BY Munn & Co.
ATTORNEY.

UNITED STATES PATENT OFFICE.

LINNIE A. H. GRENELLE, OF HAMPTON, IOWA.

VEIL-HOLDER.

SPECIFICATION forming part of Letters Patent No. 464,864, dated December 8, 1891.

Application filed July 10, 1891. Serial No. 398,997. (No model.)

*To all whom it may concern:*

Be it known that I, LINNIE A. H. GRENELLE, of Hampton, in the county of Franklin and State of Iowa, have invented a new and useful Improvement in Veil Holders or Fasteners, of which the following is a full, clear, and exact description.

This invention relates to devices for fastening and holding ladies' veils in place; and it consists in a novel construction of the same, substantially as hereinafter described, and more particularly pointed out in the claims. It also is applicable as a holder for other purposes or uses, as will be hereinafter named; but as it is more especially intended for holding veils it will herein be more particularly described accordingly.

Reference is to be had to the accompanying drawings, forming a part of this specification, in which similar letters of reference indicate corresponding parts in all the figures.

Figure 1:
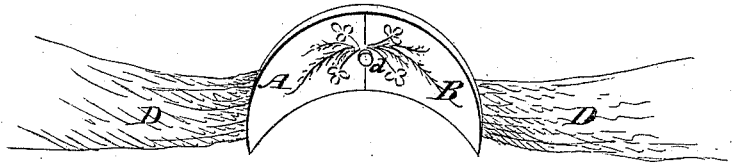
Figure 2:
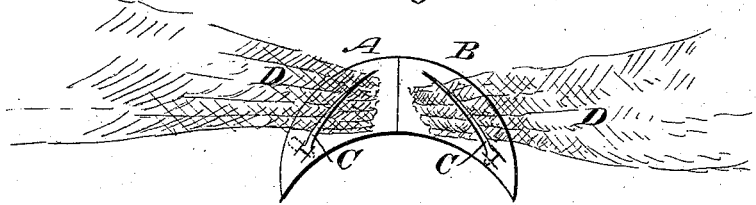
Figure 3:
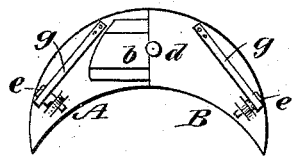
Figure 4:
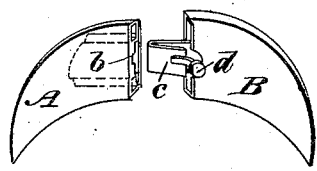
Figure 5:
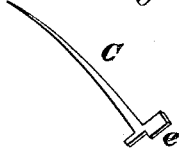

Figure 1 represents a face view of the device as applied to holding the two ends of a veil; Fig. 2, a back view of the same; Fig. 3, a face view of the device with the outer plate of its shell removed; Fig. 4, a view in perspective of the two separable portions of the whole device detached from one another, and Fig. 5 a perspective view of one of a pair of hinged pins which form details of the device.

The holder, which is here shown of crescent shape, but may be of any other desired form and of various qualities, plain or ornamented, is composed of two leading transversely-separable flat or plate-like portions A B. It may be made of rolled gold or other metals or materials, plated or otherwise, or of glass or precious stones, and, if desired, be engraved with any ornamental design on its top or outer-face side.

The two body-pieces A B are in the form of hollow shells, the one A of which is provided at its meeting end with a socket $b$ and the other piece B with a spring-catch $c$, operated by a knob $d$ or otherwise from the outside and engaging or locking with the socket $b$ when the two separable portions A B are brought together at their meeting ends. Upon the exterior of the under or rear side of the pieces A B are two hinged pins C C, which shut down upon or are contiguous to said pieces, and are held so closed by means of springs $g$ $g$ within the parts A B, bearing upon a knuckle-like projection $e$ on the joint end of each pin. These pins C C serve to secure the two ends of the veil in place on the main pieces A B and admit of the ends of the veil D being drawn or adjusted under the pins between the latter and the separable parts A B, as shown in Fig. 2.

The holder, constructed as described, is designed, when in use, to hold each end of the face-veil in place at back of the head. The hinged pins C C, which form clamping means, are raised to place the veil on the flat surface of the holder at the back of the latter. Said pins are then shut down on the veil to hold it firmly in place. Should the veil either be too tight or loose on the person after its ends are previously engaged with the parts A B while separated and subsequently locked together by the clasp, it may be readily adjusted without lifting the hinged pins by simply slightly pulling on the veil in the required direction, excepting when there is an excessive tightness or looseness of the veil, when the pins may be raised to make the necessary adjustment. The device can as easily be used on long thick veils as on short light or thin ones by passing the hinged pins through a portion of the veil, leaving space enough between where the veil is taken up to pass the veil around the head, and then, by taking the holder between each thumb and first finger, pressing down on the knob of the catch. The veil and holder are then lifted up even or in proper relation with the face of the person, the center of the veil being against the face, and each part A B of the holder, still held between the thumb and forefinger, is carried to the back of the head to the proper desired position, and which should be as close to the lower edge of the hat or bonnet as possible, after which the two parts A and B are closed together and locked by the clasp.

The whole device is small and neat and may be ornamental, and it may readily be transferred from one veil to another. It also makes a very pretty hat or bonnet ornament, and can be used as a hair-holder or ornament by placing a small lock of hair under each hinged pin. It may also be used as a clasp for collars of dresses, ribbons around the neck or wrists, is light in weight, and may be readily used wherever it is desired.

Having thus described my invention, what I claim as new, and desire to secure by Letters Patent, is—

1. A veil-holder comprising two separable parts united to form a continuous and unbroken surface, each part being provided with a pivoted and spring-pressed pin on its rear face, substantially as described.

2. In a veil-holder, the combination, with two body-pieces detachably connected together, of pins hinged to the body-pieces and provided with knuckle-like projections, and springs within the body-pieces and engaging the knuckle-like projections of the pins, substantially as described.

3. The herein-described veil-fastener, consisting of a body formed in two sections, a catch uniting the two sections at their meeting edges, and two pins secured to the outer portions of the respective body-sections and extending along the same toward the meeting edges thereof, substantially as shown and described.

LINNIE A. H. GRENELLE.

Witnesses:
D. C. MALLERY,
E. C. GRENELLE.